United States Patent [19]

Schmeidl et al.

[11] 4,128,623

[45] Dec. 5, 1978

[54] MANUFACTURE OF A SOLUTION OF NITROSYLSULFURIC ACID IN SULFURIC ACID

[75] Inventors: Karl Schmeidl, Frankenthal; Wilhelm Brunkhorst, Limburgerhof; Eberhard Michaelis, Weingarten, all of Fed. Rep. of Germany

[73] Assignee: BASF Aktiengesellschaft, Ludwigshafen, Fed. Rep. of Germany

[21] Appl. No.: 869,672

[22] Filed: Jan. 16, 1978

[51] Int. Cl.² ............................................. C01B 21/54
[52] U.S. Cl. ..................................................... 423/388
[58] Field of Search ................................. 423/388, 405

[56] References Cited

U.S. PATENT DOCUMENTS 3,180,834   4/1965   Karsay et al. ..................... 423/388

Primary Examiner—O. R. Vertiz
Assistant Examiner—Wayne A. Langel
Attorney, Agent, or Firm—Keil, Thompson & Shurtleff

[57] ABSTRACT

Solutions of nitrosylsulfuric acid in sulfuric acid are manufactured by reacting nitric acid with sulfur in sulfuric acid or oleum. Less than 0.33 gram atom of sulfur is employed per mole of nitric acid, and after completion of the reaction the free nitric acid still present in the nitrosylsulfuric acid solution is reduced with lactones.

6 Claims, No Drawings

MANUFACTURE OF A SOLUTION OF NITROSYLSULFURIC ACID IN SULFURIC ACID

The present invention relates to a process for the manufacture of solutions of nitrosylsulfuric acid in sulfuric acid.

The manufacture of solutions of nitrosylsulfuric acid in sulfuric acid by reacting nitric acid with sulfur in the presence of oleum (German Published Application DAS 1,212,947) or in the presence of concentrated acid (J.Am.Pharm.Assoc. 16 (1927), 30), has been disclosed. In oleum, for example, the reaction takes place in accordance with the following equation:

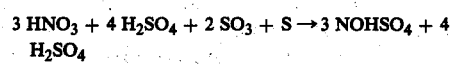

$$3 HNO_3 + 4 H_2SO_4 + 2 SO_3 + S \rightarrow 3 NOHSO_4 + 4 H_2SO_4$$

In addition to the main reaction between nitric acid, sulfur and oleum, some side reactions, in which, inter alia, sulfur dioxide is formed, also take place. For this reason, the sulfur is employed in excess over the amounts required in accordance with the above equation. This excess should be not less than 10% and usually more than 20% above the theoretical amount (German Published Application DAS 1,212,947); according to the Examples in the said Application, the reaction is carried out with an excess of up to 50% of sulfur, and the sulfur not consumed in the main reaction and the side reactions has to be removed from the reaction mixture by filtration after the reaction.

The process disclosed in J.Am.Pharmac.Assoc., which is carried out in concentrated sulfuric acid, also employs an excess of sulfur, namely about 18% over the theoretical amount.

Such a method is disadvantageous above all in cases where a sulfur-free nitrosylsulfuric acid solution is required which does not contain nitric acid; such is the case, for example, when the solution is to be used for the manufacture of azo dyes. A low content of nitric acid is particularly important in the manufacture of azo dyes since, for example, oxidative decomposition of a diazo component may occur. Diazo components of the halonitroaniline type are particularly sensitive to small amounts of nitric acid. Removing sulfur from nitrosylsulfuric acid solutions requires special precautions and special equipment because of the corrosiveness of the solutions, and recycling furthermore entails substantial nuisance to the operatives.

It is an object of the present invention to provide a process for the manufacture of solutions of nitrosylsulfuric acid in sulfuric acid by reacting nitric acid with sulfur in sulfuric acid or oleum, wherein filtration of sulfur is avoided and at the same time solutions which are virtually free from nitric acid are obtained.

We have found that this object is achieved by employing less than 0.33 gram atom of sulfur per mole of nitric acid and reducing the free nitric acid, still present in the nitrosylsulfuric acid solution after completion of the reaction, by means of lactones.

The process according to the invention is advantageously carried out by adding a mixture of nitric acid and sulfuric acid or oleum to a suspension of sulfur in a solution of nitrosylsulfuric acid in sulfuric acid. The rate of addition is adjusted so as to maintain a reaction temperature of from 70° to 100° C., preferably from 80° to 90° C. In general, the addition is complete in from 2 to 4 hours. The mixture is then stirred further for about the same length of time, at the same temperature, in order to convert the entire sulfur. Surprisingly, this does not reduce the yield of nitrosylsulfuric acid, though it has been disclosed that nitrosylsulfuric acid is decomposed, with evolution of $NO_2$, when heated in the presence of nitric acid.

The nitric acid and the sulfuric acid (calculated as $H_2SO_4$) are employed in such amounts that from 1.4 to 4 moles of sulfuric acid are introduced per mole of nitric acid (calculated as 100% $HNO_3$). The use of oleum, containing up to 50 percent by weight of $SO_3$, in place of sulfuric acid is preferred. In general, oleum containing up to 24 percent by weight of $SO_3$ suffices, and gives nitrosylsulfuric acid solutions having a sufficiently low solidification point. Higher concentrations are employed advantageously if aqueous nitric acid containing, for example, 60 percent by weight of $HNO_3$ is used. The process can be carried out under atmospheric pressure. The sulfur is suspended in a solution of nitrosylsulfuric acid in sulfuric acid, advantageously, for example, a solution from a preceeding batch, in such amount that the suspension is still easy to stir. The strength of the nitrosylsulfuric acid solution is in general from 40 to 50%.

The starting materials for the reaction can be technical-grade materials. Concentrated nitric acid containing from about 55 to 65% by weight of $HNO_3$ can be employed, in which case more highly concentrated oleum, with $SO_3$ contents of from 25 to 50 percent by weight, is employed to bind the water. However, it is advantageous to employ commercial fuming nitric acid containing from 96 to 100% by weight of $HNO_3$. Commercial sulfur powder or sulfur granules with particle sizes of from 0.05 to 2.0 mm are suitable forms of sulfur.

According to the invention, less than the stoichiometrically required amount of sulfur is employed, i.e. less than 0.33 gram atom of sulfur per mole of 100% strength nitric acid. As a rule, from 0.25 to 0.32 gram atom, preferably from 0.28 to 0.30 gram atom, of sulfur is employed per mole of nitric acid, i.e. the resulting solutions, after complete reaction, still contain from 1 to about 20% by weight of the nitric acid originally employed.

According to a further characteristic of the invention, the reaction solution obtained after consumption of the sulfur is treated with lactones. Examples of suitable lactones are γ-butyrolactone, δ- or γ-valerolactone, 3-methyl-δ-valerolactone or phthalide, or mixtures of these. Liquid lactones are of particular interest, because they are easily metered. The handling of the water-miscible compounds does not entail any special hazards, particularly since the flash points of these compounds are very high. The use of γ-butyrolactone is particularly preferred.

The lactones reduce the free nitric acid still present in the reaction solution, surprisingly without attacking nitrosylsulfuric acid, which is highly reactive. The reduction of the nitric acid with lactones requires elevated temperatures and in general the reaction only starts above 50° C. The upper limit is imposed by the evolution of nitrous fumes. For this reason, temperatures above 120° C. are to be avoided, and temperatures from 75° to 95° C. are preferred. The lactones are advantageously added in portions. It is a particular characteristic of the lactones that the reduction takes place without such complications as sudden evolution of gas, associated with frothing. The reaction takes place exothermically and the rate of addition therefore also depends on the amount of heat to be removed.

The amount of lactone required depends on the amount of the nitric acid still present in the solution. Per part by weight of free nitric acid, at most about one part by weight of lactone is required, but in general amounts of less than 0.5 part by weight suffice. It is an advantage that the end point of the reduction is readily recognizable, since, at the end point, the original yellow color of the solution changes to blue, with the formation of so-called blue or violet acid, which is an adduct of NO with nitrosylsulfuric acid. The change in hue is noticeable at an early stage at the point at which the lactone is dripped in.

In the Examples which follow, parts and percentages are by weight.

EXAMPLE 1

60 parts of sulfur are added to 455 parts of a solution of nitrosylsulfuric acid in 97.5% strength sulfuric acid; the solution contains 46.5 parts of nitrosylsulfuric acid. The mixture is heated to 70° C. whilst stirring and a mixture of 960 parts of oleum, containing 24 percent of sulfur trioxide, and 378 parts of 100% strength nitric acid (molar ratio $HNO_3:S = 1:0.31$) is then added in the course of from about 2 to 3 hours. The rate of addition is regulated so that the temperature does not fall below 70° C. or rise above 90° C. If the temperature falls below 70° C., the rate of oxidation slows down, whilst above 90° C. the exothermic oxidation takes place too violently, and nitrous fumes are evolved.

After completion of the addition of the nitric acid/oleum mixture, the solution is stirred for from about 3 to 5 hours at 90° C. 1.842 parts of a clear solution containing 49.1% of nitrosylsulfuric acid and 0.2% of nitric acid are obtained. The yield of nitrosylsulfuric acid is 692.8 parts, corresponding to 97.7% of theory, based on sulfur.

Butyrolactone is now added dropwise, whilst stirring, to the solution which is at from about 75° to 80° C. The color change is reached with about 1 part of butyrolactone. Nitric acid is no longer detectable in the solution thus obtained. Where desired, the color of the solution can be shifted to yellow by adding a small amount of nitric acid - as little as about 0.05 g suffices.

The resulting nitrosylsulfuric acid solution may be used for the manufacture of azo dyes. Its solidification point is below −10° C.

EXAMPLE 2

The method described in Example 1 is followed, but instead of 60 parts of sulfur only 57 parts (molar ratio $HNO_3:S = 1:0.30$) are employed. 1,838 parts of a clear solution, containing 48.3% of nitrosylsulfuric acid and 0.5% of nitric acid, are obtained. The yield of nitrosylsulfuric acid is 99% of theory, based on sulfur.

The reduction of the nitric acid with butyrolactone in the case of this batch requires 2 parts of lactone. The nitrosylsulfuric acid content is 48.6%.

EXAMPLE 3

The method described in Example 1 is followed, but instead of 60 parts of sulfur only 50 parts (molar ratio $HNO_3:S = 1:0.26$) are employed. 1,828 parts of a solution containing 42.2% of nitrosylsulfuric acid and 2.7% of nitric acid are obtained. The yield of nitrosylsulfuric acid is 94%, based on sulfur.

To reduce the nitric acid, 17 parts of δ-valerolactone are added at 70° C.; this changes the color of the solution to blue. The nitrosylsulfuric acid content is now 43.9%.

The same result is obtained by using γ-valerolactone or 3-methyl-δ-valerolactone in place of δ-valerolactone.

We claim:

1. A process for the manufacture of a solution of nitrosylsulfuric acid in sulfuric acid by reacting nitric acid with sulfur in sulfuric acid or oleum, wherein less than 0.33 gram atom of sulfur is employed per mole of nitric acid and after completion of the reaction the free nitric acid still present in the nitrosylsulfuric acid solution is reduced with a lactone.

2. A process as claimed in claim 1, wherein from 0.25 to 0.32 gram atom of sulfur is employed per mole of nitric acid.

3. A process as claimed in claim 1, wherein the reduction is carried out at above 50° C.

4. A process as claimed in claim 1, wherein the lactone employed is δ-valerolactone, γ-valerolactone, 3-methyl-δ-valerolactone, γ-butyrolactone or phthalide or a mixture of these.

5. A process as claimed in claim 4, wherein γ-butyrolactone is employed.

6. A process as claimed in claim 1, wherein at most 1 part by weight of lactone is added per part by weight of the nitric acid contained in the nitrosylsulfuric acid solution.

* * * * *

UNITED STATES PATENT AND TRADEMARK OFFICE
CERTIFICATE OF CORRECTION

PATENT NO. : 4,128,623
DATED : December 5, 1978
INVENTOR(S) : SCHMEIDL ET AL

It is certified that error appears in the above-identified patent and that said Letters Patent are hereby corrected as shown below:

In the Heading, insert the following section after heading "[22]":

--[30] Foreign Application Priority Data

February 15, 1977  Fed. Rep. of Germany . .2706311--

Signed and Sealed this

First Day of May 1979

[SEAL]

Attest:

RUTH C. MASON
Attesting Officer

DONALD W. BANNER
Commissioner of Patents and Trademarks